(12) United States Patent
Davidson

(10) Patent No.: US 7,906,464 B2
(45) Date of Patent: Mar. 15, 2011

(54) COMPOSITIONS AND METHODS FOR THE REMOVAL OF OIL-BASED FILTERCAKES

(75) Inventor: Eric Davidson, Aberdeen (GB)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 12/120,159

(22) Filed: May 13, 2008

(65) Prior Publication Data

US 2009/0286701 A1    Nov. 19, 2009

(51) Int. Cl.
  C02F 2/10    (2006.01)
  C09K 8/524   (2006.01)
  C09K 8/584   (2006.01)
  C09K 8/60    (2006.01)
  C09K 8/74    (2006.01)
  C23G 1/06    (2006.01)

(52) U.S. Cl. ......... 507/235; 507/239; 507/252; 507/261; 507/262; 507/266; 507/269

(58) Field of Classification Search .................. 507/203, 507/235, 239, 252, 261, 262, 266, 269
See application file for complete search history.

(56) References Cited

U.S. PATENT DOCUMENTS

| | | |
|---|---|---|
| 1,922,154 A | 8/1933 | de Groote |
| 2,050,392 A | 8/1936 | Starr |
| 2,059,459 A | 11/1936 | Hund et al. |
| 2,206,187 A | 7/1940 | Herbsman |
| 2,238,671 A | 4/1941 | Woodhouse |
| 2,681,889 A | 6/1954 | Menaul et al. |
| 2,703,316 A | 3/1955 | Schneider |
| 2,863,832 A | 12/1958 | Perrine |
| 2,910,436 A | 10/1959 | Fatt et al. |
| 3,173,484 A | 3/1965 | Huitt |
| 3,195,635 A | 7/1965 | Fast |
| 3,272,650 A | 9/1966 | MacVittie |
| 3,302,719 A | 2/1967 | Fischer |
| 3,364,995 A | 1/1968 | Atkins |
| 3,366,178 A | 1/1968 | Malone |
| 3,455,390 A | 7/1969 | Gallus |
| 3,481,404 A | 12/1969 | Gidley |
| 3,548,945 A | 12/1970 | Gidley |
| 3,630,285 A | 12/1971 | Claytor, Jr. et al. |
| 3,784,585 A | 1/1974 | Schmitt et al. |
| 3,819,525 A | 6/1974 | Hattenbrun |
| 3,828,854 A | 8/1974 | Templeton et al. |
| 3,836,465 A | 9/1974 | Rhudy et al. |
| 3,868,998 A | 3/1975 | Lybarger et al. |
| 3,912,692 A | 10/1975 | Casey et al. |
| 3,948,672 A | 4/1976 | Harnsberger |
| 3,955,993 A | 5/1976 | Curtice et al. |
| 3,960,736 A | 6/1976 | Free et al. |
| 3,968,840 A | 7/1976 | Tate |
| 3,986,355 A | 10/1976 | Klaeger |
| 3,998,272 A | 12/1976 | Maly |
| 3,998,744 A | 12/1976 | Arnold et al. |
| 4,010,071 A | 3/1977 | Colegrove |
| 4,068,718 A | 1/1978 | Cooke, Jr. et al. |
| 4,136,739 A | 1/1979 | Salathiel et al. |
| 4,169,798 A | 10/1979 | DeMartino |
| 4,172,066 A | 10/1979 | Zweigle et al. |
| 4,252,421 A | 2/1981 | Foley, Jr. |
| 4,265,673 A | 5/1981 | Pace et al. |
| 4,267,887 A | 5/1981 | Watanabe |
| 4,299,825 A | 11/1981 | Lee |
| 4,387,769 A | 6/1983 | Erbstoesser et al. |
| 4,460,052 A | 7/1984 | Gockel |
| 4,470,915 A | 9/1984 | Conway |
| 4,498,995 A | 2/1985 | Gockel |
| 4,502,540 A | 3/1985 | Byham |
| 4,506,734 A | 3/1985 | Nolte |

(Continued)

FOREIGN PATENT DOCUMENTS

EP    0278540 A2    8/1988

(Continued)

OTHER PUBLICATIONS

Ingram, Stephen, et al., "Enhancing and sustaining well production: Granite Wash, Texas Panhandle," SPE 106531, SPE Production and Operations Symposium, Oklahoma City, Oklahoma, Mar. 31-Apr. 3, 2007, pp. 1-11, Society of Petroleum Engineers.

(Continued)

*Primary Examiner* — Timothy J. Kugel
*Assistant Examiner* — Atnaf Admasu
(74) *Attorney, Agent, or Firm* — Craig W. Roddy; Conley Rose, P.C.

(57) ABSTRACT

A method of servicing a wellbore comprising providing a composition comprising a mutual solvent precursor, an acid precursor, and an aqueous fluid, and contacting the composition with oil wet solids in the wellbore. A method of servicing a wellbore comprising introducing an oil-based fluid into a wellbore, wherein the oil-based fluid forms oil wet solids in the wellbore, contacting the oil wet solids in the wellbore with a composition comprising a mutual solvent precursor, an acid precursor and an aqueous fluid, and allowing the oil wet solids to become water wet. A method of servicing a well bore comprising contacting a composition comprising a formate ester with oil wet solids in the well bore under conditions wherein the formate ester hydrolyzes to release formic acid, wherein the formic acid catalyzes the hydrolysis of additional formate ester, and wherein all or a portion of the formate ester converts at least a portion of the oil-wet solids to water-wet solids.

26 Claims, 1 Drawing Sheet

U.S. PATENT DOCUMENTS

| | | | |
|---|---|---|---|
| 4,521,316 A | 6/1985 | Sikorski | |
| 4,526,695 A | 7/1985 | Erbstoesser et al. | |
| 4,632,876 A | 12/1986 | Laird et al. | |
| 4,694,905 A | 9/1987 | Armbruster | |
| 4,713,183 A | 12/1987 | Patel et al. | |
| 4,715,967 A | 12/1987 | Bellis et al. | |
| 4,716,964 A | 1/1988 | Erbstoesser et al. | |
| 4,767,706 A | 8/1988 | Levesque et al. | |
| 4,772,346 A | 9/1988 | Anderson, Jr. et al. | |
| 4,785,884 A | 11/1988 | Armbruster | |
| 4,793,416 A | 12/1988 | Mitchell | |
| 4,797,262 A | 1/1989 | Dewitz | |
| 4,809,783 A | 3/1989 | Hollenbeck et al. | |
| 4,817,721 A | 4/1989 | Pober | |
| 4,822,500 A | 4/1989 | Dobson, Jr. et al. | |
| 4,829,100 A | 5/1989 | Murphey et al. | |
| 4,836,940 A | 6/1989 | Alexander | |
| 4,843,118 A | 6/1989 | Lai et al. | |
| 4,848,467 A | 7/1989 | Cantu et al. | |
| 4,863,980 A | 9/1989 | Cowan et al. | |
| 4,886,354 A | 12/1989 | Welch et al. | |
| 4,894,231 A | 1/1990 | Moreau et al. | |
| 4,957,165 A | 9/1990 | Cantu et al. | |
| 4,961,466 A | 10/1990 | Himes et al. | |
| 4,986,353 A | 1/1991 | Clark et al. | |
| 4,986,354 A | 1/1991 | Cantu et al. | |
| 4,986,355 A | 1/1991 | Casad et al. | |
| 5,034,139 A | 7/1991 | Reid et al. | |
| 5,082,056 A | 1/1992 | Tackett, Jr. | |
| 5,142,023 A | 8/1992 | Gruber et al. | |
| 5,152,781 A | 10/1992 | Tang et al. | |
| 5,161,615 A | 11/1992 | Hutchins et al. | |
| 5,203,834 A | 4/1993 | Hutchins et al. | |
| 5,213,446 A | 5/1993 | Dovan | |
| 5,216,050 A | 6/1993 | Sinclair | |
| 5,247,059 A | 9/1993 | Gruber et al. | |
| 5,249,628 A | 10/1993 | Surjaatmadia | |
| 5,251,697 A | 10/1993 | Shuler | |
| 5,295,542 A | 3/1994 | Cole et al. | |
| 5,304,620 A | 4/1994 | Holtmyer et al. | |
| 5,314,031 A | 5/1994 | Hale et al. | |
| 5,325,923 A | 7/1994 | Surjaatmadja et al. | |
| 5,330,005 A | 7/1994 | Card et al. | |
| 5,359,026 A | 10/1994 | Gruber | |
| 5,360,068 A | 11/1994 | Sprunt et al. | |
| 5,363,916 A | 11/1994 | Himes et al. | |
| 5,373,901 A | 12/1994 | Norman et al. | |
| 5,386,874 A | 2/1995 | Laramay et al. | |
| 5,396,957 A | 3/1995 | Surjaatmadja et al. | |
| 5,402,846 A | 4/1995 | Jennings, Jr. et al. | |
| 5,439,055 A | 8/1995 | Card et al. | |
| 5,460,226 A | 10/1995 | Lawson et al. | |
| 5,464,060 A | 11/1995 | Hale et al. | |
| 5,475,080 A | 12/1995 | Gruber et al. | |
| 5,484,881 A | 1/1996 | Gruber et al. | |
| 5,487,897 A | 1/1996 | Polson et al. | |
| 5,492,177 A | 2/1996 | Yeh et al. | |
| 5,496,557 A | 3/1996 | Feijen et al. | |
| 5,497,830 A | 3/1996 | Boles et al. | |
| 5,499,678 A | 3/1996 | Surjaatmadja et al. | |
| 5,501,276 A | 3/1996 | Weaver et al. | |
| 5,505,787 A | 4/1996 | Yamaguchi | |
| 5,512,071 A | 4/1996 | Yam et al. | |
| 5,536,807 A | 7/1996 | Gruber et al. | |
| 5,555,936 A | 9/1996 | Pirri et al. | |
| 5,591,700 A | 1/1997 | Harris et al. | |
| 5,594,095 A | 1/1997 | Gruber et al. | |
| 5,602,083 A | 2/1997 | Gabrysch et al. | |
| 5,604,186 A | 2/1997 | Hunt et al. | |
| 5,607,905 A | 3/1997 | Dobson, Jr. et al. | |
| 5,613,558 A | 3/1997 | Dillenbeck, III | |
| 5,670,473 A | 9/1997 | Scepanski | |
| 5,678,632 A | 10/1997 | Moses et al. | |
| 5,697,440 A | 12/1997 | Weaver et al. | |
| 5,698,322 A | 12/1997 | Tsai et al. | |
| 5,723,416 A | 3/1998 | Liao | |
| 5,762,138 A | 6/1998 | Ford et al. | |
| 5,765,642 A | 6/1998 | Surjaatmadja | |
| 5,783,527 A | 7/1998 | Dobson, Jr. et al. | |
| 5,791,415 A | 8/1998 | Nguyen et al. | |
| 5,799,734 A | 9/1998 | Norman et al. | |
| 5,813,466 A | 9/1998 | Harris et al. | |
| 5,833,000 A | 11/1998 | Weaver et al. | |
| 5,849,401 A | 12/1998 | El-Afandi et al. | |
| 5,853,048 A | 12/1998 | Weaver et al. | |
| 5,888,944 A | 3/1999 | Patel | |
| 5,893,416 A | 4/1999 | Read | |
| 5,905,061 A | 5/1999 | Patel | |
| 5,908,073 A | 6/1999 | Nguyen et al. | |
| 5,909,774 A | 6/1999 | Griffith et al. | |
| 5,916,849 A | 6/1999 | House | |
| 5,924,488 A | 7/1999 | Nguyen et al. | |
| 5,964,291 A | 10/1999 | Bourne et al. | |
| 5,977,030 A | 11/1999 | House | |
| 5,977,031 A | 11/1999 | Patel | |
| 5,979,557 A * | 11/1999 | Card et al. | 166/300 |
| 5,985,800 A | 11/1999 | Patel | |
| 5,990,050 A | 11/1999 | Patel | |
| 5,996,693 A | 12/1999 | Heathman | |
| 6,004,400 A | 12/1999 | Bishop et al. | |
| 6,024,170 A | 2/2000 | McCabe et al. | |
| 6,028,113 A | 2/2000 | Scepanski | |
| 6,029,755 A | 2/2000 | Patel | |
| 6,047,772 A | 4/2000 | Weaver et al. | |
| 6,110,875 A | 8/2000 | Tjon-Joe-Pin et al. | |
| 6,114,410 A | 9/2000 | Betzold | |
| 6,123,159 A | 9/2000 | Brookey et al. | |
| 6,123,965 A | 9/2000 | Jacob et al. | |
| 6,131,661 A | 10/2000 | Conner et al. | |
| 6,135,987 A | 10/2000 | Tsai et al. | |
| 6,143,698 A | 11/2000 | Murphey et al. | |
| 6,148,917 A | 11/2000 | Brookey et al. | |
| 6,162,766 A | 12/2000 | Muir et al. | |
| 6,169,058 B1 | 1/2001 | Le et al. | |
| 6,172,011 B1 | 1/2001 | Card et al. | |
| 6,189,615 B1 | 2/2001 | Sydansk | |
| 6,202,751 B1 | 3/2001 | Chatterji et al. | |
| 6,209,643 B1 | 4/2001 | Nguyen et al. | |
| 6,209,646 B1 | 4/2001 | Reddy et al. | |
| 6,214,773 B1 | 4/2001 | Harris et al. | |
| 6,218,342 B1 | 4/2001 | Patel | |
| 6,221,920 B1 | 4/2001 | Hillion et al. | |
| 6,242,390 B1 | 6/2001 | Mitchell et al. | |
| 6,258,859 B1 | 7/2001 | Dahayanake et al. | |
| 6,260,622 B1 | 7/2001 | Blok et al. | |
| 6,279,656 B1 * | 8/2001 | Sinclair et al. | 166/310 |
| 6,291,013 B1 | 9/2001 | Gibson et al. | |
| 6,300,286 B1 | 10/2001 | Dobson, Jr. et al. | |
| 6,302,209 B1 | 10/2001 | Thompson, Sr. et al. | |
| 6,308,788 B1 | 10/2001 | Patel et al. | |
| 6,311,773 B1 | 11/2001 | Todd et al. | |
| 6,323,307 B1 | 11/2001 | Bigg et al. | |
| 6,326,458 B1 | 12/2001 | Gruber et al. | |
| 6,328,105 B1 | 12/2001 | Betzold | |
| 6,330,917 B2 | 12/2001 | Chatterji et al. | |
| 6,357,527 B1 | 3/2002 | Norman et al. | |
| 6,364,945 B1 | 4/2002 | Chatterji et al. | |
| 6,380,138 B1 | 4/2002 | Ischy et al. | |
| 6,387,986 B1 | 5/2002 | Moradi-Araghi et al. | |
| 6,390,195 B1 | 5/2002 | Nguyen et al. | |
| 6,394,185 B1 | 5/2002 | Constien | |
| 6,401,819 B1 | 6/2002 | Harris et al. | |
| 6,405,809 B2 | 6/2002 | Patel et al. | |
| 6,422,314 B1 | 7/2002 | Todd et al. | |
| 6,422,326 B1 | 7/2002 | Brookey et al. | |
| 6,432,155 B1 | 8/2002 | Swazey et al. | |
| 6,454,003 B1 | 9/2002 | Chang et al. | |
| 6,485,947 B1 | 11/2002 | Rajgarhia et al. | |
| 6,488,091 B1 | 12/2002 | Weaver et al. | |
| 6,488,763 B2 | 12/2002 | Brothers et al. | |
| 6,494,263 B2 | 12/2002 | Todd | |
| 6,508,305 B1 | 1/2003 | Brannon et al. | |
| 6,509,301 B1 | 1/2003 | Vollmer | |
| 6,527,051 B1 | 3/2003 | Reddy et al. | |
| 6,543,276 B2 | 4/2003 | Murphy, Jr. et al. | |
| 6,554,071 B1 | 4/2003 | Reddy et al. | |
| 6,566,310 B2 | 5/2003 | Chan | |

| | | |
|---|---|---|
| 6,569,814 B1 | 5/2003 | Brady et al. |
| 6,578,630 B2 | 6/2003 | Simpson et al. |
| 6,589,917 B2 | 7/2003 | Patel et al. |
| 6,599,863 B1 | 7/2003 | Palmer et al. |
| 6,608,006 B2 | 8/2003 | Taylor et al. |
| 6,620,437 B2 | 9/2003 | Ewbank et al. |
| 6,667,279 B1 | 12/2003 | Hessert et al. |
| 6,669,771 B2 | 12/2003 | Tokiwa et al. |
| 6,681,856 B1 | 1/2004 | Chatterji et al. |
| 6,686,328 B1 | 2/2004 | Binder |
| 6,691,780 B2 | 2/2004 | Nguyen et al. |
| 6,691,805 B2 | 2/2004 | Thaemlitz |
| 6,702,023 B1 | 3/2004 | Harris et al. |
| 6,710,019 B1 | 3/2004 | Sawdon et al. |
| 6,716,797 B2 | 4/2004 | Brookey |
| 6,737,385 B2 | 5/2004 | Todd et al. |
| 6,761,218 B2 | 7/2004 | Nguyen et al. |
| 6,763,888 B1 | 7/2004 | Harris et al. |
| 6,764,981 B1 | 7/2004 | Eoff et al. |
| 6,770,293 B2 | 8/2004 | Angel et al. |
| 6,790,811 B2 | 9/2004 | Patel |
| 6,793,018 B2 | 9/2004 | Dawson et al. |
| 6,793,025 B2 | 9/2004 | Patel et al. |
| 6,793,730 B2 | 9/2004 | Reddy et al. |
| 6,806,233 B2 | 10/2004 | Patel |
| 6,806,235 B1 | 10/2004 | Mueller et al. |
| 6,817,414 B2 | 11/2004 | Lee |
| 6,818,594 B1 | 11/2004 | Freeman et al. |
| 6,828,280 B2 | 12/2004 | England et al. |
| 6,837,309 B2 | 1/2005 | Boney et al. |
| 6,840,318 B2 | 1/2005 | Lee et al. |
| 6,852,173 B2 | 2/2005 | Banerjee et al. |
| 6,861,394 B2 | 3/2005 | Ballard et al. |
| 6,877,563 B2 | 4/2005 | Todd et al. |
| 6,881,709 B2 | 4/2005 | Nelson et al. |
| 6,883,608 B2 | 4/2005 | Parlar et al. |
| 6,886,635 B2 | 5/2005 | Hossaini et al. |
| 6,896,058 B2 | 5/2005 | Munoz, Jr. et al. |
| 6,904,971 B2 | 6/2005 | Brothers et al. |
| 6,908,887 B2 | 6/2005 | Thaemlitz |
| 6,908,888 B2 | 6/2005 | Lee et al. |
| 6,949,491 B2 | 9/2005 | Cooke, Jr. |
| 6,953,090 B2 | 10/2005 | Vijn et al. |
| 6,959,767 B2 | 11/2005 | Horton et al. |
| 6,978,838 B2 | 12/2005 | Parlar et al. |
| 6,981,552 B2 | 1/2006 | Reddy et al. |
| 6,983,798 B2 | 1/2006 | Todd |
| 6,983,801 B2 | 1/2006 | Dawson et al. |
| 6,987,083 B2 | 1/2006 | Phillippi et al. |
| 6,989,354 B2 | 1/2006 | Thaemlitz et al. |
| 6,997,259 B2 | 2/2006 | Nguyen |
| 7,000,701 B2 | 2/2006 | Todd et al. |
| 7,007,752 B2 | 3/2006 | Reddy et al. |
| 7,021,377 B2 | 4/2006 | Todd et al. |
| 7,021,383 B2 | 4/2006 | Todd et al. |
| 7,032,663 B2 | 4/2006 | Nguyen |
| 7,036,585 B2 | 5/2006 | Zhou et al. |
| 7,036,586 B2 | 5/2006 | Roddy et al. |
| 7,036,587 B2 | 5/2006 | Munoz, Jr. et al. |
| 7,044,220 B2 | 5/2006 | Nguyen et al. |
| 7,044,224 B2 | 5/2006 | Nguyen |
| 7,049,272 B2 | 5/2006 | Sinclair et al. |
| 7,052,901 B2 | 5/2006 | Crews |
| 7,063,151 B2 | 6/2006 | Nguyen et al. |
| 7,066,258 B2 | 6/2006 | Justus et al. |
| 7,066,260 B2 | 6/2006 | Sullivan et al. |
| 7,069,994 B2 | 7/2006 | Cooke, Jr. |
| 7,080,688 B2 | 7/2006 | Todd et al. |
| 7,093,658 B2 | 8/2006 | Chatterji et al. |
| 7,093,664 B2 | 8/2006 | Todd et al. |
| 7,096,947 B2 | 8/2006 | Todd et al. |
| 7,098,171 B2 | 8/2006 | Thaemlitz |
| 7,101,829 B2 | 9/2006 | Guichard et al. |
| 7,112,557 B2 | 9/2006 | Thaemlitz |
| 7,125,826 B2 | 10/2006 | Taylor et al. |
| 7,131,491 B2 | 11/2006 | Blauch et al. |
| 7,132,389 B2 | 11/2006 | Lee |
| 7,134,496 B2 | 11/2006 | Jones et al. |
| 7,140,438 B2 | 11/2006 | Frost et al. |
| 7,147,067 B2 | 12/2006 | Getzlaf et al. |
| 7,151,077 B2 | 12/2006 | Prud'homme et al. |
| 7,153,902 B2 | 12/2006 | Altes et al. |
| 7,156,174 B2 | 1/2007 | Roddy et al. |
| 7,159,659 B2 | 1/2007 | Welton et al. |
| 7,165,617 B2 | 1/2007 | Lord et al. |
| 7,166,560 B2 | 1/2007 | Still et al. |
| 7,168,489 B2 | 1/2007 | Frost et al. |
| 7,172,022 B2 | 2/2007 | Reddy et al. |
| 7,178,594 B2 | 2/2007 | Patel |
| 7,178,596 B2 | 2/2007 | Blauch et al. |
| 7,195,068 B2 | 3/2007 | Todd |
| 7,204,311 B2 | 4/2007 | Welton et al. |
| 7,204,312 B2 | 4/2007 | Roddy et al. |
| 7,205,264 B2 | 4/2007 | Boles |
| 7,216,705 B2 | 5/2007 | Saini et al. |
| 7,219,731 B2 | 5/2007 | Sullivan et al. |
| 7,222,672 B2 | 5/2007 | Blauch et al. |
| 7,228,904 B2 | 6/2007 | Todd et al. |
| 7,238,646 B2 | 7/2007 | Thaemlitz et al. |
| 7,256,159 B2 | 8/2007 | Guichard et al. |
| 7,261,156 B2 | 8/2007 | Nguyen et al. |
| 7,264,051 B2 | 9/2007 | Nguyen et al. |
| 7,265,079 B2 | 9/2007 | Willberg et al. |
| 7,267,170 B2 | 9/2007 | Mang et al. |
| 7,267,466 B2 | 9/2007 | Reiss |
| 7,299,869 B2 | 11/2007 | Kalman |
| 7,299,874 B2 | 11/2007 | Welton et al. |
| 7,303,014 B2 | 12/2007 | Reddy et al. |
| 7,303,019 B2 | 12/2007 | Welton et al. |
| 7,306,037 B2 | 12/2007 | Nguyen et al. |
| 7,314,850 B2 | 1/2008 | Taylor et al. |
| 7,322,412 B2 | 1/2008 | Badalamenti et al. |
| 7,353,879 B2 | 4/2008 | Todd et al. |
| 7,380,606 B2 | 6/2008 | Pursley et al. |
| 7,514,390 B2 | 4/2009 | Chan |
| 2001/0016562 A1 | 8/2001 | Muir et al. |
| 2003/0130133 A1 | 7/2003 | Vollmer |
| 2003/0147965 A1 | 8/2003 | Bassett et al. |
| 2003/0230407 A1 | 12/2003 | Vijn et al. |
| 2004/0070093 A1 | 4/2004 | Mathiowitz et al. |
| 2004/0072696 A1 | 4/2004 | Patel |
| 2004/0138068 A1 | 7/2004 | Rimmer et al. |
| 2004/0170836 A1 | 9/2004 | Bond et al. |
| 2004/0176478 A1 | 9/2004 | Dahayanake et al. |
| 2004/0231845 A1 | 11/2004 | Cooke, Jr. |
| 2005/0028976 A1 | 2/2005 | Nguyen |
| 2005/0034861 A1 | 2/2005 | Saini et al. |
| 2005/0059556 A1 | 3/2005 | Munoz, Jr. et al. |
| 2005/0059557 A1 | 3/2005 | Todd et al. |
| 2005/0130848 A1 | 6/2005 | Todd et al. |
| 2005/0183741 A1 | 8/2005 | Surjaatmadja et al. |
| 2005/0209107 A1 | 9/2005 | Pursley et al. |
| 2005/0257932 A1 | 11/2005 | Davidson et al. |
| 2005/0272613 A1 | 12/2005 | Cooke, Jr. |
| 2005/0277554 A1 | 12/2005 | Blauch et al. |
| 2006/0016596 A1 | 1/2006 | Pauls et al. |
| 2006/0032633 A1 | 2/2006 | Nguyen |
| 2006/0041028 A1 | 2/2006 | Crews |
| 2006/0046938 A1 | 3/2006 | Harris et al. |
| 2006/0065397 A1 | 3/2006 | Nguyen et al. |
| 2006/0105917 A1 | 5/2006 | Munoz, Jr. |
| 2006/0105918 A1 | 5/2006 | Munoz, Jr. |
| 2006/0108150 A1 | 5/2006 | Luke et al. |
| 2006/0118300 A1 | 6/2006 | Welton et al. |
| 2006/0169182 A1 | 8/2006 | Todd et al. |
| 2006/0169450 A1 | 8/2006 | Mang et al. |
| 2006/0172891 A1 | 8/2006 | Gewehr et al. |
| 2006/0172893 A1 | 8/2006 | Todd et al. |
| 2006/0172894 A1 | 8/2006 | Mang et al. |
| 2006/0172895 A1 | 8/2006 | Mang et al. |
| 2006/0183646 A1 | 8/2006 | Welton et al. |
| 2006/0185848 A1 | 8/2006 | Surjaatmadja et al. |
| 2006/0229212 A1 | 10/2006 | Willberg et al. |
| 2006/0234873 A1 | 10/2006 | Ballard |
| 2006/0258543 A1 | 11/2006 | Saini |
| 2006/0258544 A1 | 11/2006 | Saini |
| 2006/0276345 A1 | 12/2006 | Todd et al. |
| 2006/0283597 A1 | 12/2006 | Schriener et al. |

| | | | |
|---|---|---|---|
| 2007/0027253 | A1 | 2/2007 | Jones et al. |
| 2007/0100029 | A1 | 5/2007 | Reddy et al. |
| 2007/0169938 | A1 | 7/2007 | Moorehead et al. |
| 2007/0173416 | A1 | 7/2007 | Moorehead et al. |
| 2007/0298977 | A1 | 12/2007 | Mang et al. |
| 2008/0009423 | A1 | 1/2008 | Mang et al. |
| 2008/0076682 | A1 | 3/2008 | Jones et al. |
| 2008/0078549 | A1 | 4/2008 | Moorehead et al. |
| 2008/0110618 | A1 | 5/2008 | Quintero et al. |
| 2008/0169102 | A1 | 7/2008 | Carbajal et al. |
| 2008/0169103 | A1 | 7/2008 | Carbajal et al. |
| 2008/0287324 | A1 | 11/2008 | Pursley et al. |

FOREIGN PATENT DOCUMENTS

| | | | |
|---|---|---|---|
| EP | 0510762 | A2 | 10/1992 |
| EP | 0879935 | A2 | 11/1998 |
| EP | 1413710 | A1 | 4/2004 |
| GB | 2032491 | A | 5/1980 |
| GB | 2109034 | A | 5/1983 |
| GB | 2116966 | A | 10/1983 |
| GB | 2163790 | A | 3/1986 |
| GB | 2412389 | A | 9/2005 |
| JP | 2004181820 | A | 2/2004 |
| WO | 9315127 | A1 | 8/1993 |
| WO | 9407949 | A1 | 4/1994 |
| WO | 9408078 | A1 | 4/1994 |
| WO | 9408090 | A1 | 4/1994 |
| WO | 9509879 | A1 | 4/1995 |
| WO | 9711845 | A1 | 4/1997 |
| WO | 9927229 | A1 | 6/1999 |
| WO | 0008112 | A1 | 2/2000 |
| WO | 0057022 | A1 | 9/2000 |
| WO | 0102698 | A1 | 1/2001 |
| WO | 0142387 | A1 | 6/2001 |
| WO | 0187797 | A1 | 11/2001 |
| WO | 0194744 | A1 | 12/2001 |
| WO | 0212674 | A1 | 2/2002 |
| WO | 02055843 | A1 | 7/2002 |
| WO | 03027431 | A2 | 4/2003 |
| WO | 03027431 | A3 | 4/2003 |
| WO | 2004007905 | A1 | 1/2004 |
| WO | 2004037946 | A1 | 5/2004 |
| WO | 2004038176 | A1 | 5/2004 |
| WO | 2005095755 | A1 | 10/2005 |
| WO | 2006029019 | A2 | 3/2006 |
| WO | 2006029019 | A3 | 3/2006 |
| WO | 2006093863 | A2 | 9/2006 |
| WO | 2006093863 | A3 | 9/2006 |
| WO | 2006109016 | A1 | 10/2006 |
| WO | 2008038033 | A1 | 4/2008 |
| WO | 2008045734 | A2 | 4/2008 |
| WO | 2008045734 | A3 | 4/2008 |

OTHER PUBLICATIONS

Penny, G., et al., "The application of microemulsion additives in drilling and stimulation results in enhanced gas production," SPE 94274, SPE Production and Operations Symposium, Oklahoma City, Oklahoma, Apr. 17-19, 2005, pp. 1-9, Society of Petroleum Engineers.

Ahmad, M., et al., "Ortho ester hydrolysis: direct evidence for a three-stage reaction mechanism," XP002322843, 1 page.

Akzo Nobel Material Safety Data Sheet entitled "ETHOMEEN® SV/12," May 7, 2003, 6 pages, Akzo Nobel Surface Chemistry LLC, Akzo Nobel Chemicals Ltd.

Albertsson, Ann-Christine, et al., "Aliphatic polyesters: synthesis, properties and applications," Advances in Polymer Science, 2002, pp. 1-161 plus 2 Preface pages, vol. 157, Springer-Verlag Berlin Heidelberg.

Baroid Fluid Services brochure entitled "BARACARB® bridging agent," Apr. 2005, 2 pages, Halliburton.

Baroid Fluid Services brochure entitled "GELTONE® II viscosifier," 2006, 1 page, Halliburton.

Baroid Fluid Services brochure entitled "LE SUPERMUL™ emulsifier," 2006, 1 page, Halliburton.

Baroid Fluid Services brochure entitled "N-FLOW™ filter cake breaker systems," Jan. 2007, 2 pages, Halliburton.

Baroid Fluid Services brochure entitled "N-FLOW(SM) services," 1 page, Halliburton.

Baroid Fluid Services brochure entitled "RHEMOD™ L viscosifier/suspension agent," 2006, 1 page, Halliburton.

Biehn, G.F., et al., "Polyvinyl alcohol as an emulsifying agent," pp. 1449-1453, vol. 40, No. 8, Industrial and Engineering Chemistry.

Bowmer, C. T., et al., "The ecotoxicity and the biodegradability of lactic acid, alkyl lactate esters and lactate salts," Chemosphere, 1998, pp. 1317-1333, vol. 37, No. 7, Elsevier Science Ltd, Great Britain.

Cantu, Lisa A., et al., "Laboratory and field evaluation of a combined fluid-loss-control additive and gel breaker for fracturing fluids," SPE Production Engineering, Aug. 1990, pp. 253-260, Society of Petroleum Engineers.

Chatterji, J., et al., "Applications of water-soluble polymers in the oil field," Journal of Petroleum Technology, Nov. 1981, pp. 2042-2056, The Society of Petroleum Engineers of AIME.

Chiang, Y., et al., "Hydrolysis of ortho esters: further investigation of the factors which control the rate-determining step," XP002322842, 1 page.

Colon, A. Alberto, et al., "The hydrolysis of some alkyl lactates. II. "Neutral" and acid hydrolyses," Dec. 5, 1953, pp. 6074-6075 plus 1 publication page, The Journal of the American Chemical Society.

Cordes, E. H., et al., "Mechanism and catalysis for hydrolysis of acetals, ketals, and ortho esters," 1974, pp. 581-603, vol. 74, No. 5, Chemical Reviews.

Daccord, Gérard, et al., "Acidizing physics," Reservoir Stimulation, pp. 13-1 to13-13, Dowell Schlumberger.

Davison, J. M., et al., "Oil-based muds for reservoir drilling: their performance and cleanup characteristics," SPE 58798, SPE International Symposium on Formation Damage, Lafayette, Louisiana, Feb. 23-24, 2000, pp. 1-11, Society of Petroleum Engineers.

Dechy-Cabaret, Odile, et al., "Controlled ring-opening polymerization of lactide and glycolide," Chemical Reviews, 2004, pp. A to Z plus AA to AD, American Chemical Society.

Designation: G111-97, "Standard guide for corrosion tests in high temperature or high pressure environment, or both," Dec. 1997, pp. 1-5 plus 1 license agreement page, ASTM International.

Designation: G 111-97 (Reapproved 2006), "Standard guide for corrosion tests in high temperature or high pressure environment, or both," May 2006, pp. 1-5 plus 1 license agreement page, ASTM International.

Filachione, E. M., et al., "Preparation of methyl lactate," Apr. 1945, pp. 388-390, vol. 37, No. 4, Industrial and Engineering Chemistry.

Foreign communication from a related counterpart application—International Search Report, PCT/GB2007/003754, Mar. 13, 2008, 3 pages.

Funkhouser, Gary P., et al., "Synthetic polymer fracturing fluid for high-temperature applications," SPE 80236, SPE International Symposium on Oilfield Chemistry, Houston, Texas, Feb. 5-7, 2003, pp. 1-6, Society of Petroleum Engineers Inc.

Halliburton brochure entitled "Cobra Frac(SM) service: coiled tubing fracturing—cost-effective method for stimulating untapped reserves," 2000, 2 pages, Halliburton Energy Services, Inc.

Halliburton brochure entitled "CobraJet Frac(SM) service: cost-effective technology that can help reduce cost per BOE produced, shorten cycle time and reduce capex," 2 pages, Halliburton Communications.

Halliburton brochure entitled "Musol®: mutual solvent," Feb. 2007, 2 pages, Halliburton Communications.

Halliburton brochure entitled "Musol® A: mutual solvent," 1998, 2 pages, Halliburton Energy Services, Inc.

Halliburton brochure entitled "N-Flow(SM) AO Stimulation Service," Aug. 2005, 2 pages, Halliburton Communications.

Halliburton, "SurgiFrac(SM) service: a quick and cost-effective method to help boost production from openhole horizontal completions," Oct. 2002, 2 pages, Halliburton.

Heller, Jorge, et al., "Poly(ortho esters) for the pulsed and continuous delivery of peptides and proteins," Controlled Release and Biomedical Polymers Department, SRI International, Menlo Park, California, pp. 39-56.

Heller, Jorge, et al., "Poly(ortho esters)—from concept to reality," Biomacromolecules, Sep./Oct. 2004, pp. 1625-1632, vol. 5, No. 5, American Chemical Society.

Heller, Jorge, et al., "Poly(ortho esters): synthesis, characterization, properties and uses," Advanced Drug Delivery Reviews, 2002, pp. 1015-1039, vol. 54, Elsevier Science B.V.

Heller, J., et al., Poly(ortho ester)s—their development and some recent applications, European Journal of Pharmaceutics and Biopharmaceutics, 2000, pp. 121-128, vol. 50, Elsevier Science B.V.

Heller, J., et al., Release of norethindrone from poly(ortho esters), Mid-Aug. 1981, pp. 727-731, vol. 21, No. 11, Polymer Engineering and Science.

Holland, John M., et al., "Hydrolysis of alkyl acetates in a phosphate-buffered aqueous medium," Mar. 1961, pp. 463-466, vol. 65.

Howard, William L., et al., "Chelating agents," pp. 764-795, vol. 5.

Kajiyama, Tetsuto, et al., "Improved synthesis with high yield and increased molecular weight of poly (a,β-malic acid) by direct polycondensation," Biomacromolecules, 2004, pp. 169-174, vol. 5, No. 1, American Chemical Society.

Katritzky, Alan R., et al., Aquathermolysis: reactions of organic compounds with superheated water, Acc. Chem. Res., 1996, pp. 399-406, vol. 29, No. 8, American Chemical Society.

Kellog, David R., "The effect of neutral salts on hydrolysis by water," 1909, pp. 886-900 plus 1 publication page, vol. 31, The Journal of the American Chemical Society.

Kellogg, David R., "The effect of neutral salts on hydrolysis by water," 1909, pp. 403-405 plus 1 publication page, vol. 31, The Journal of the American Chemical Society.

Love, T.G., et al., "Selectively placing many fractures in openhole horizontal wells improves production," SPE 50422, SPE International Conference on Horizontal Well Technology, Calgary, Alberta, Canada, Nov. 1-4, 1998, pp. 1-8, Society of Petroleum Engineers, Inc.

Mabey, W., et al., "Critical review of hydrolysis of organic compounds in water under environmental conditions," Stanford Research Institute, Menlo Park, California, 1978, pp. 383-410, vol. 7, No. 2, J. Phys. Chem. Ref. Data.

Malm, C. J., et al., "Evaluating cellulose acetylation reactivity," Apr. 1957, pp. 763-768, vol. 49, No. 4, Industrial and Engineering Chemistry.

Malm, Carl J., et al., "Hydrolysis of cellulose esters," Jan. 1966, pp. 81-87, vol. 5, No. 1, I&EC Process Design and Development.

Malm, C. J., et al., "The action of fatty acids on cellulose," Jan. 1929, pp. 274-278 plus 1 publication page, vol. 51, The Journal of the American Chemical Society.

Matsuyama, Kiyoshi, et al., "Environmentally benign formation of polymeric microshperes by rapid expansion of supercritical carbon dioxide solution with a nonsolvent," Environmental Science & Technology, 2001, pp. 4149-4155, vol. 35, No. 20, American Chemical Society.

McDaniel, B. W., et al., "Evolving new stimulation process proves highly effective in level 1 dual-lateral completion," SPE 78697, SPE Eastern Regional Meeting, Lexington, Kentucky, Oct. 23-25, 2002, pp. 1-11, Society of Petroleum Engineers Inc.

Mikhailov, M., et al., "An experimental investigation of drilling-fluid filter-cake removal by acid jetting," SPE 112373, SPE International Symposium and Exhibition on Formation Damage Control, Lafayette, Louisiana, Feb. 13-15, 2008, pp. 1-9, Society of Petroleum Engineers.

Myers, R. Thomas, et al., "The rate of saponification of acetates of unsaturated alcohols," Apr. 1952, pp. 461-463, vol. 56.

Ng, S. Y., et al., "Development of a poly(ortho ester) prototype with a latent acid in the polymer backbone for 5-fluorouracil delivery," Journal of Controlled Release, 2000, pp. 367-374, vol. 65, Elsevier Science B.V.

Ng, S. Y., et al., "Synthesis and erosion studies of self-catalyzed poly(ortho ester)s," Macromolecules, 1997, pp. 770-772, vol. 30, No. 4, American Chemical Society.

Norman. Lewis R., et al., "Temperature-stable acid-gelling polymers: laboratory evaluation and field results," Nov. 1984, pp. 2011-2018, Journal of Petroleum Technology.

Notice of Allowance dated Sep. 26, 2008 (4 pages), U.S. Appl. No. 11/536,833, filed Sep. 29, 2006.

Office Action dated Jun. 22, 2007 (11 pages), U.S. Appl. No. 11/622,898, filed Jan. 12, 2007.

Office Action (Final) dated Dec. 27, 2007 (10 pages), U.S. Appl. No. 11/622,898, filed Jan. 12, 2007.

Office Action dated Feb. 12, 2008 (8 pages), U.S. Appl. No. 11/536,833, filed Sep. 29, 2006.

Office Action dated Mar. 19, 2008 (13 pages), U.S. Appl. No. 11/622,907, filed Jan. 12, 2007.

Office Action dated May 21, 2008 (21 pages), U.S. Appl. No. 11/622,898, filed Jan. 12, 2007.

Patent application entitled "Microemulsifiers and Methods of Making and Using Same," by Ryan van Zanten, et al., filed Sep. 26, 2008 as U.S. Appl. No. 12/239,442.

Peterson, Marvin L., et al., "Esterification," An I/EC Unit Processes Review, Sep. 1960, pp. 807-811, vol. 52, No. 9, Industrial and Engineering Chemistry.

Purac America Inc. Material Safety Data Sheet for PURASOLV ML plus Purac product line datasheets, http://hazard.com/msds/f2/cbj/cbjlq.html, Dec. 13, 1991, 6 pages.

Quintero, L., et al., "One-step acid removal of an invert emulsion," SPE 94604, SPE European Formation Damage Conference, Scheveningen, The Netherlands, May 25-27, 2005, pp. 1-9, Society of Petroleum Engineers.

Reid, E. Emmet, "Esterification," Sep. 1953, pp. 1936-1943, vol. 45, No. 9, Industrial and Engineering Chemistry.

Reid, E. Emmet, "Esterification," Sep. 1954, pp. 1801-1808, vol. 46, No. 9, Industrial and Engineering Chemistry.

Rothen-Weinhold, A., et al., "Release of BSA from poly(ortho ester) extruded thin strands," Journal of Controlled Release, 2001, pp. 31-37, vol. 71, Elsevier Science B.V.

Schwach-Abdellaoui, K., et al., "Control of molecular weight for auto-catalyzed poly(ortho ester) obtained by polycondensation reaction," International Journal of Polymer Anal. Charact., 2002, pp. 145-161, vol. 7, Taylor & Francis.

Schwach-Abdellaoui, K., et al., "Hydrolysis and erosion studies on autocatalyzed poly(ortho esters) containing lactoyl-lactyl acid dimers," Macromolecules, 1999, pp. 301-307, vol. 32, No. 2, American Chemical Society.

Simmons, Tara L., et al., "Poly(phenyllactide): synthesis, characterization, and hydrolytic degradation," Biomacromolecules, 2001, pp. 658-663, vol. 2, No. 3, American Chemical Society.

Sinclair, Richard G., "Slow-release pesticide system: polymers of lactic and glycolic acids as ecologically beneficial, cost-effective encapsulating materials," Oct. 1973, pp. 955-956, vol. 7, No. 10, Environmental Science and Technology.

Siskin, Michael, et al., "Aqueous organic chemistry. 1. Aquathermolysis: comparison with thermolysis in the reactivity of aliphatic compounds," Energy & Fuels, 1990, pp. 475-482, vol. 4, No. 5, American Chemical Society.

Skrabal, Anton, "On the kinetics of acid and basic catalysis," Chemical Institute of the University, Gras, 1928, pp. 687-696, Aberdeen: The University Press.

Skrabal, Anton, et al., "The hydrolysis rate of orthoformic acid ethyl ether," Chemical Institute of the University of Graz, Jan. 13, 1921, pp. 1-38 plus 1 cover page, Translated from German by the McElroy Translation Company, Job No. 415-104489.

Special Products Material Safety Data Sheet entitled "GS 22 Series (89A, 89B, 91A, 91B, 92A, 92B, 94A, 94B)," Version 1.0, Nov. 10, 2005, 5 pages, Special Products.

Stefanidis, Dimitrios, "General base catalysis of ester hydrolysis," Jul. 14, 1993, pp. 6045-6050 plus 1 cover page and 1 publication page, vol. 115, No. 14, Journal of the American Chemical Society.

Stepan Product Bulletin entitled "Amphosol® LB," Jan. 2006, 3 pages, Stepan.

SYNPERONIC PE/L64 Safety Data Sheet, Version 3, Nov. 22, 2005, 6 pages, ICI Group of Companies.

Tarkow, Harold, et al., "The reaction of formic acid with carbohydrates. I. The reaction of formic acid with sugars," Feb. 1952, pp. 262-266, vol. 56.

Tarkow, Harold, et al., "The reaction of formic acid with carbohydrates. II. Polysaccharides: A new method for determining accessibility," Feb. 1952, pp. 266-271, vol. 56.

Todd, B., et al., A chemical 'trigger' useful for oilfield applications, SPE 92709, SPE International Symposium on Oilfield Chemistry, Houston, Texas, Feb. 2-4, 2005, pp. 1-7, Society of Petroleum Engineers, Inc.

Todd, Brad, et al., "An innovative system for complete cleanup of a drill-in fluid filter cake," SPE 86494, SPE International Symposium and Exhibition on Formation Damage Control, Lafayette, Louisiana, Feb. 18-20, 2004, pp. 1-9, Society of Petroleum Engineers.

Todd, Brad, et al., "Laboratory device for testing of delayed-breaker solutions on horizontal wellbore filter cakes," SPE 68968, SPE European Formation Damage Conference, The Hague, The Netherlands, May 21-22, 2001, pp. 1-9, Society of Petrolelum Engineers, Inc.

Toncheva, V., et al., "Use of block copolymers of poly(ortho esters) and poly(ethylene glycol) micellar carriers as potential tumour targeting systems," Journal of Drug Targeting, 2003, pp. 345-353, vol. 11, No. 6, Taylor & Francis Ltd.

Vichaibun, Virun, et al., "A new assay for the enzymatic degradation of polylactic acid," 2003, pp. 297-300, vol. 29, ScienceAsia.

Whistler, Roy L., et al., "Distribution of formyl groups in amylose monoformate," Aug. 20, 1959, pp. 4427-4429 plus 1 cover page, vol. 81, The Journal of the American Chemical Society.

Whitfill, Donald L., "Session 5: fluid evaluation and selection for minimal damage," Keynote Paper, SPE European Formation Damage Conference, Amsterdam, May 21-22, 2001, pp. 1-4, Society of Petroleum Engineers, Inc.

Williams, Roger J., et al., "The relation between the hydrolysis equilibrium constant of esters and the strengths of the corresponding acids," May 1928, pp. 1267-1271, vol. 50.

Wolff, I. A., et al., "Starch formate," Jul. 20, 1957, pp. 3860-3862 plus 1 cover page, vol. 79, The Journal of the American Chemical Society.

Woodbridge, R. G., Jr, "Notes on cellulose esters," 1909, pp. 1067-1071 plus 1 cover page, vol. 31, The Journal of the American Chemical Society.

Yin, Mao, et al., "Preparation and characterization of substituted polylactides," Macromolecules, Nov. 16, 1999, pp. 7711-7718, vol. 32, No. 23, American Chemical Society.

Yin, Mao, et al., "Synthesis and properties of polymers derived from substituted lactic acids," 2001, pp. 147-159, American Chemical Society.

Zignani, M., et al., "Subconjunctival biocompatibility of a viscous bioerodable poly(ortho ester)," 1998, pp. 277-285, John Wiley & Sons, Inc.

Bumajdad, Ali, et al., "Properties of mixed alcohol—zwitterionic surfactant films in quaternary water-in-oil microemulsions," Langmuir, 2003, pp. 7219-7225, vol. 19, No. 18, American Chemical Society.

Gotch, Albert J., et al., "Formation of single-phase microemulsions in toluene/water/nonionic surfactant systems," Langmuir, 2008, pp. 4485-4493, vol. 24, No. 9, American Chemical Society.

Gradzielski, M., "Effect of the cosurfactant structure on the bending elasticity in nonionic oil-in-water microemulsions," Langmuir, 1998, pp. 6037-6044, vol. 14, No. 21, American Chemical Society.

Hellweg, Thomas, "Phase structures of microemulsions," Current Opinion in Colloid & Interface Science, 2002, pp. 50-56, vol. 7, Elsevier Science Ltd.

Kumar, Promod, et al., "Handbook of microemulsion science and technology."

Kunieda, Hironobu, et al., "Effect of added salt on the maximum solubilization in an ionic-surfactant microemulsion," Langmuir, 1996, pp. 5796-5799, vol. 12, No. 24, American Chemical Society.

Rosano, Henri L., et al., "Microemulsion systems," 1987, 2 pages, Marcel Dekker, Inc., USA.

Office Action (Final) dated Nov. 10, 2008 (13 pages), U.S. Appl. No. 11/622,898, filed Jan. 12, 2007.

Office Action (Final) dated Nov. 13, 2008 (22 pages), U.S. Appl. No. 11/622,907, filed Jan. 12, 2007.

Office Communication (Examiner's Answer) dated Sep. 14, 2009 (10 pages), U.S. Appl. No. 11/622,898, filed Jan. 12, 2007.

Office Action dated Feb. 10, 2009 (9 pages), U.S. Appl. No. 11/622,907, filed Jan. 12, 2007.

Foreign communication from a related counterpart application—International Search Report and Written Opinion, PCT/GB2009/001183, Jul. 15, 2009, 10 pages.

Foreign communication from a related counterpart application—International Search Report and Written Opinion, PCT/GB2009/002156, Feb. 5, 2010, 8 pages.

Office Action (Final) dated Nov. 16, 2009 (8 pages), U.S. Appl. No. 11/622,907, filed Jan. 12, 2007.

Notice of Allowance dated Aug. 11, 2010 (83 pages), U.S. Appl. No. 12/239,442, filed Sep. 26, 2008.

Office Action dated Sep. 10, 2010 (9 pages), U.S. Appl. No. 11/622,907, filed Jan. 12, 2007.

* cited by examiner

US 7,906,464 B2

COMPOSITIONS AND METHODS FOR THE REMOVAL OF OIL-BASED FILTERCAKES

CROSS-REFERENCE TO RELATED APPLICATIONS

The subject matter of the present application is related to U.S. patent application Ser. No. 11/536,833 filed Sep. 26, 2006 and entitled "Methods and Compositions Related to the Control of the Rates of Acid-Generating Compounds in Acidizing Operations" and Ser. No. 11/622,898 filed Jan. 12, 2007 and entitled "Surfactant Wash Treatment Fluids and Associated Methods," each of which is hereby incorporated herein by reference in its entirety for all purposes.

STATEMENT REGARDING FEDERALLY SPONSORED RESEARCH OR DEVELOPMENT

Not applicable.

BACKGROUND OF THE INVENTION

1. Field of the Invention

This disclosure relates to servicing a wellbore. More specifically, it relates to servicing a wellbore with compositions comprising (i) an acid and/or an acid precursor and (ii) a mutual solvent precursor.

2. Background of the Invention

Natural resources such as gas, oil, and water residing in a subterranean formation can be recovered by drilling wells into the formation. Well drilling involves drilling a wellbore down to the formation while circulating a drilling fluid or mud through the wellbore. Various types of drilling fluids, also known as drill-in fluids when used in the productive interval, have been used in well drilling, such as water-based fluids, mineral oil-based fluids, and synthetic oil-based fluids. Such drilling fluids form a thin, slick filter cake on the formation face that provides for successful drilling of the wellbore and that helps prevent loss of fluid to the subterranean formation.

In well drilling, several stages may be used to produce oil found in subterranean formations. The first stage, which is known as the primary production stage, allows the oil to flow into a production well (or wells) under natural forces. At first, the natural forces may be sufficient to drive the oil to the surface where it is recovered. However, at some point, pumps may be required to displace the oil from the wellbore to the surface. A secondary recovery operation thus is typically performed to recover additional amounts of the oil from the reservoir. A common secondary recovery operation known as secondary flooding involves injecting a fluid such as water into a so-called injection well (or wells) to drive oil in the formation to the production well (or wells). Tertiary recovery operations such as tertiary flooding may also be used to drive the remaining oil from the formation to the production well.

Typically, the presence of the filter cake on the face of the subterranean formation can adversely affect the flow of fluid though the injection wells and the production wells. In the case of the injection wells, particularly in deepwater environments, the injected fluid is not flowed back to remove the filter cake left by the drill-in fluid. The pump pressures (e.g., fracturing pressures) required to inject past the filter cake are higher than desirable for achieving good sweep efficiency of the oil. Thus, it would be desirable to develop improved compositions and methods for removing a filter cake from a subterranean formation.

SUMMARY

Disclosed herein is a method of servicing a wellbore comprising providing a composition comprising a mutual solvent precursor, an acid precursor, and an aqueous fluid, and contacting the composition with oil wet solids in the wellbore.

Also disclosed herein is a method of servicing a wellbore comprising introducing an oil-based fluid into a wellbore, wherein the oil-based fluid forms oil wet solids in the wellbore, contacting the oil wet solids in the wellbore with a composition comprising a mutual solvent precursor; an acid precursor and an aqueous fluid, and allowing the oil wet solids to become water wet.

Further disclosed herein is a method of servicing a well bore comprising contacting a composition comprising a formate ester with oil wet solids in the well bore under conditions wherein the formate ester hydrolyzes to release formic acid, wherein the formic acid catalyzes the hydrolysis of additional formate ester, and wherein all or a portion of the formate ester converts at least a portion of the oil-wet solids to water-wet solids.

Further disclosed herein is a method of servicing a wellbore comprising providing a composition comprising a mutual solvent precursor, an acid, and an aqueous fluid, and contacting the composition with oil wet solids in the wellbore.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
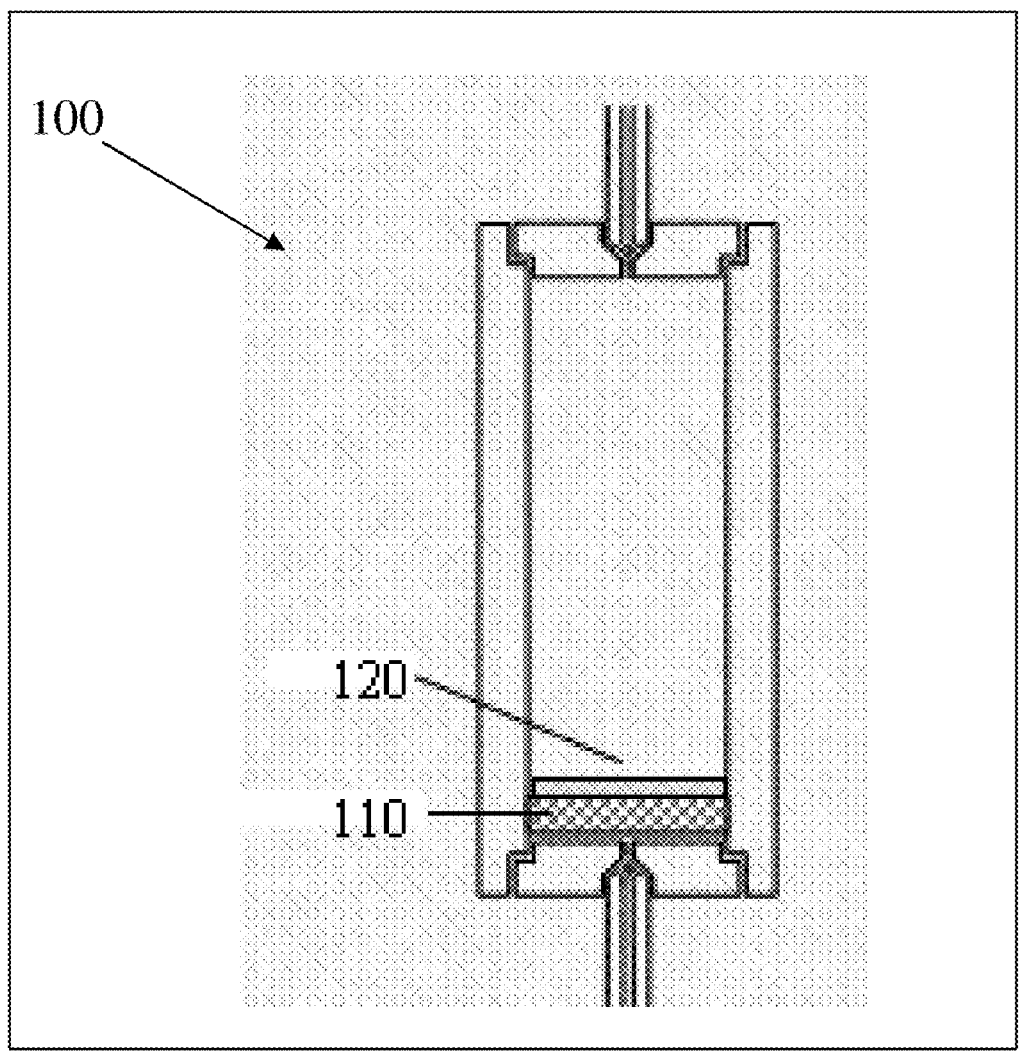
FIG. 1 is an illustration of a high temperature high pressure cell used in Example 1.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

Disclosed herein are wellbore servicing compositions comprising a mutual solvent precursor, an acid precursor, and an aqueous fluid. Such compositions may be referred to herein as compositions for oil-based filtercake removal (COFR). In some embodiments, the COFR may be used for the removal of a water-based filtercake containing oil-wet components. In other embodiments, the COFR may be used for the removal of a water based filtercake that has been contaminated with oil wet components (e.g., crude oil) Hereinafter, the disclosure will refer to the use of compositions for the removal of an oil-based filtercake although the removal of other compositions of the type disclosed herein are also contemplated. The COFRs may be placed downhole and used to service a wellbore, for example providing for a time-delayed removal of an oil-based filtercake from the wellbore. Each of the components of the COFR as well as methods of using same will be described in more detail herein.

In an embodiment, the COFR comprises a mutual solvent precursor. Herein a mutual solvent is defined as a material that is soluble in oil, water, and acid-based treatment fluids. Given that the mutual solvent is miscible with more than one class of liquids, such materials may also be referred to as coupling agents because such materials can cause two ordinarily immiscible liquids to combine with each other. Herein a mutual solvent precursor is defined as a mutual solvent or coupling agent that has been modified to provide for delayed release of the mutual solvent. Such mutual solvent precursors may also be referred to as time-delayed and/or time-released mutual solvents. Examples of modifications to mutual solvents to form mutual solvent precursors include without limitation the addition of an operable functionality component or substituent, physical encapsulation or packaging, or combinations thereof. The operable functionality component or substituent may be acted upon in any fashion (e.g., chemically, physically, thermally, etc.) and under any conditions compatible with the components of the process in order to release the mutual solvent at a desired time and/or under desired conditions such as in situ wellbore conditions. In an embodiment, the mutual solvent precursor may comprise at least one modified mutual solvent (e.g., having an operable functionality, encapsulation, packaging, etc.) such that when acted upon and/or in response to pre-defined conditions (e.g., in situ wellbore conditions such as temperature, pressure, chemical environment), a mutual solvent is released.

Mutual solvents suitable for modification to form mutual solvent precursors include for example and without limitation glycol ethers such as ethylene glycol monobutylether (EGMBE) or propylene glycol monobutylether; methanol; isopropyl alcohol; alcohol ethers; aldehydes; ketones; aromatic solvents; derivatives thereof; and combinations thereof. Examples of commercially available mutual solvents include MUSOL mutual solvent sold by Halliburton Energy Services, SOL-15 sold by Fracmaster Ltd., and SUPER-SOL sold by Osca.

In an embodiment, the mutual solvent precursor comprises an esterified mutual solvent. In such embodiments, the ester linkage may be hydrolyzed to release the mutual solvent. For example, the ester linkage may be hydrolyzed by contact with water present in the aqueous fluid of the COFR and/or water present in situ in the wellbore. In an embodiment, the mutual solvent precursor comprises a glycol ether ester, and upon hydrolysis of the ester linkage, a glycol ether mutual solvent is released. Examples of glycol ether esters suitable for use in this disclosure include without limitation butyl glycol acetate, butyl diglycol acetate, butyl triglycol acetate, butyl glycol dimethoxyacetal, isooctanol acetate, isopropanol acetate, 1-methoxy-2-propanol acetate and the corresponding acetals, propionates and the like.

The concentration of the mutual solvent precursor in the COFR may range from about 1% to about 50% by volume, alternatively from about 1% to about 30%, alternatively from about 5% to about 15%, alternatively from about 10% to about 20%. Other factors that may be considered in deciding how much of the mutual solvent precursor to use include, but are not limited to; the temperature of the formation; the pressure of the formation; the particular mutual solvent precursor used; and the expected contact time of the generated mutual solvent with the filtercake. Other suitable mutual solvent precursors are disclosed in U.S. Pat. Nos. 6,877,563 and 7,021,383 the disclosures of which are incorporated by reference herein in their entirety.

In an embodiment, the COFR comprises an acid precursor. Herein an acid precursor is defined as a material or combination of materials that provides for delayed release of one or more acidic species. Such acid precursors may also be referred to as time-delayed and/or time-released acids. In embodiments, acid precursors comprise a material or combination of materials that may react to generate and/or liberate an acid after a period of time has elapsed. The liberation of the acidic species from the acid precursor may be accomplished through any means known to one of ordinary skill in the art with the benefits of this disclosure and compatible with the user-desired applications. In embodiments, acid precursors may be formed by modifying acids via the addition of an operable functionality component or substituent, physical encapsulation or packaging, or combinations thereof. The operable functionality component or substituent may be acted upon in any fashion (e.g., chemically, physically, thermally, etc.) and under any conditions compatible with the components of the process in order to release the acid at a desired time and/or under desired conditions such as in situ wellbore conditions. In an embodiment, the acid precursor may comprise at least one modified acid (e.g., having an operable functionality, encapsulation, packaging, etc.) such that when acted upon and/or in response to pre-defined conditions (e.g., in situ wellbore conditions such as temperature, pressure, chemical environment), an acid is released. In an embodiment, the acid precursor may comprise an acidic species that is released after exposure to an elevated temperature such as an elevated wellbore temperature. In an embodiment, the acid precursor comprises a material which reacts with one or more components of the COFR (e.g., reacts with an aqueous fluid present in the COFR) to liberate at least one acidic species.

In an embodiment, the acid precursor compound comprises a reactive ester. Hereinafter, for simplicity, the remainder of the disclosure will focus on the use of a reactive ester as the acid precursor with the understanding that other acid precursors may be used in various embodiments. The reactive ester may be converted to an acidic species by hydrolysis of the ester linkage, for example by contact with water present in the aqueous fluid of the COFR and/or water present in situ in the wellbore. Suitable acid precursors for use in the present disclosure include lactic acid derivatives such as methyl lactate, ethyl lactate, propyl lactate, butyl lactate; esters and/or formates that are water soluble or partially soluble such as ethylene glycol monoformate, ethylene glycol diformate, diethylene glycol diformate, glyceryl monoformate, glyceryl diformate, glyceryl triformate, triethylene glycol diformate; formate esters of pentaerythritol; esters or polyesters of glycerol including, but not limited to, tripropionin (a triester of propionic acid and glycerol), trilactin, esters of acetic acid and glycerol such as monoacetin, diacetin, and triacetin; esters of glycolic acid such as ethyl or methyl or propyl or butyl glycolate or esters of glycolic acid and polyols such as glycerol and glycols, aliphatic polyesters; poly(lactides); poly(glycolides); poly($\epsilon$-caprolactones); poly(hydroxybutyrates); poly(anhydrides); aliphatic polycarbonates; poly (amino acids); and polyphosphazenes; or copolymers thereof: poly(ortho esters); orthoesters (which may also be known as "poly ortho ethers" or "ortho ethers"); esters of oxalic acid; aliphatic polyesters; poly(lactides); poly(glycolides); poly($\epsilon$-caprolactones); poly(hydroxybutyrates); poly(anhydrides); poly(amino acids); esters of propionic acid; esters of butyric acid; esters of monochloroacetic acid; esters of dichloroacetic acid; esters of trichloroacetic acid; derivatives thereof; or combinations thereof. Other suitable acid precursors include halide esters and esters of acids such as esters of nitric acid, sulphuric acid, sulphonic acid, sulphinic acid, phosphoric acid, phosphorous acid, phosphonic acid, phosphinic acid, sulphamic acid and the like.

In an embodiment, the acid precursor comprises diethylene glycol diformate, diethylene glycol monoformate, monoethylene monoformate, monoethylene diformate, ethyl lactate, methyl lactate, tri-n-propyl orthoformate, tri-n-butyl orthoformate, or combinations thereof.

The choice and physical form of a suitable acid precursor may depend on a variety of factors including but not limited to the time at which liberation of the acidic species is desired relative to the placement of the COFR in the wellbore; the environmental conditions presented; the conditions within the wellbore; the temperature of the wellbore section in which the COFR is being placed; the composition of the formation water, etc. Other considerations may be evident to those skilled in the art with the benefits of this disclosure.

The acid precursor may be present in an amount ranging from about 5% to about 50% based on total volume of the composition, alternatively from about 5% to about 30%, alternatively from about 10% to about 25%, alternatively from about 12% to about 18%. Other factors that may be considered in deciding how much of the acid precursor to use include, but are not limited to, the composition of the formation, the temperature of the formation, the pressure of the formation, the diameter of the hole, the particular fines and damage present in the formation (e.g., scale, skin, calcium carbonate, silicates, and the like), the particular acid precursor used, the expected contact time of the generated acid with the formation, and the like. Suitable acid precursors have been disclosed in U.S. Pat. Nos. 6,877,563 and 7,021,383 and U.S. patent application Ser. No. 11/536,833 filed Sep. 26, 2006 and entitled "Methods and Compositions Related to the Control of the Rates of Acid-Generating Compounds in Acidizing Operations," the disclosures of which were previously incorporated by reference.

In an embodiment, the COFR may comprise a mutual solvent (e.g., EGMBE), a mutual solvent precursor (e.g., EGMBE acetate), an acid (e.g., HCl), an acid precursor (e.g., formate ester), or combinations thereof. The mutual solvent may be of a type formed from one or more of the mutual solvent precursors described herein, and the acid may be of a type formed from one or more of the acid precursors described herein. The components of the COFR may be chosen by one of ordinary skill in the art, with the benefits of this disclosure, to produce a COFR that results in the delayed removal of an oil based filtercake or a water-wet filtercake having oil-wet components. The extent of the delay may be adjusted by one of ordinary skill in the art using the benefits of this disclosure.

Aqueous fluids that may be used in the COFR include any aqueous fluid suitable for use in subterranean applications. For example, the COFR may comprise water or a brine. Suitable brines include, but are not limited to: NaCl, NaBr, CaCl$_2$, CaBr$_2$, ZnBr$_2$, sodium formate, potassium formate, cesium formate, combinations thereof and derivatives thereof. The specific brine used may be dictated by the desired density of the resulting surfactant wash treatment fluid. Denser brines may be useful in some instances. The density of the aqueous fluid, and likewise the density of the COFR, may be selected and adjusted as recognized by one skilled in the art with the benefit of this disclosure. In an embodiment, the aqueous fluid comprises a brine, alternatively NaBr. The brine may be present in an amount of from about 40 wt. % to about 90 wt. % based on the total weight of the composition. Alternatively, the aqueous fluid may comprise the balance of the COFR after considering the amount of the other components used.

In an embodiment, the COFR further comprises one or more rate adjustment materials (RAMs), which function to adjust the hydrolysis rate of the mutual solvent precursor and/or acid precursor. In some embodiments, the COFR may contain more than one acid precursor that functions as a RAM for one or more additional precursors (e.g., acid and/or mutual solvent) present in the COFR. For example, the COFR may contain more than one acid precursor wherein a first acid precursor may function to rapidly generate an acidic species that influences the half life of the hydrolysis reaction for one or more additional precursors (e.g., a second acid precursor and/or mutual solvent precursor). As such the first acidic precursor may function primarily as a RAM which controls the rate of the development of a second acidic species that is to be used in removal of the filtercake. The term "half-life" as used herein refers to the time it takes for half of the original amount of the precursor (either mutual solvent or acid) to react. For example, diethyleneglycol diformate may be employed as a RAM in a wellbore servicing composition comprising a mutual solvent precursor in the form of an ester of a hydroxyl compound. Thus, the diethyleneglycol diformate, or other RAMs, could be used to shorten the completion time of the well. Diethyleneglycol diformate forms formic acid as a result of hydrolysis, and is commercially available from Halliburton Energy Services, Inc., under the tradename "N FLOW 325." Examples of other esters or polyesters that may be suitable for adjusting the half-life of the acid and/or mutual solvent precursor in the COFR include, but are not limited to, diethyleneglycol monoformate, monoethyleneglycol diformate, monoethyleneglycol monoformate, polylactic acid, lactate esters, and derivatives and combinations thereof. The combinations of these precursors (e.g., a RAM acid precursor with one or more additional precursor materials) may be selected and designed by one of ordinary skill in the art with the benefits of this disclosure to produce a desired effect or profile (e.g., acid and/or mutual solvent release profile) at or over a period of time, for example after introduction of the COFR to a wellbore, after completion of certain wellbore servicing or processing such as drilling, etc. Such release profiles may include a steady increase or decrease in release rate (i.e., constant slope), exponential increase or decrease in release rate, step-wise increases or decreases in release rates, maximums and/or minimums in release rate (e.g., bell-shaped profiles), and combinations thereof.

In another embodiment, the RAM comprises one or more pH lowering materials (e.g., acids or acidic materials). For example, the RAM may comprise small amounts of one or more reactive materials such as mineral acids, organic acids, acidic anhydrides, p-toluenesulfonic acid, etc. to lower the pH and accelerate the hydrolysis of the acid-precursors. In other embodiments, the RAM comprises one or more pH raising materials (e.g., bases or basic materials). For example, in some instances, such as with ortho esters, the hydrolysis rate may be slowed by the addition of a small amount of a strong base such as NaOH, Na$_2$CO$_3$, NaHCO$_3$ and Mg(OH)$_2$ or organic bases such as ethanolamine or other aliphatic or aromatic amine type compounds. RAMs are also described in U.S. patent application filed Sep. 26, 2006 and entitled "Methods and Compositions Related to the Control of the Rates of Acid-Generating Compounds in Acidizing Operations" and U.S. patent application Ser. No. 11/622,898 filed Jan. 12, 2007 and entitled "Surfactant Wash Treatment Fluids and Associated Methods," each of which was previously incorporated by reference.

In some embodiments, the components of the COFR may comprise water and/or brine insoluble compounds. Alternatively, the COFR comprises compounds with a low solubility in water and/or brine. In such embodiments, the compounds may be introduced to the COFR as oil-in-water emulsions, water on oil emulsions or additives may be included in the compositions (e.g. demulsifiers) to facilitate the preparation of the COFR.

In an embodiment, the COFR comprises a mutual solvent precursor and acid precursor wherein the mutual solvent precursor and acid precursor are provided by a single compound. For example, the COFR may comprise a formate ester. Hydrolysis of a formate ester is known to be rapid in comparison to the hydrolysis of acetates or propionates under similar hydrolysis conditions. Consequently, the formate when hydrolyzed produces formic acid which in turn lowers the pH of the COFR and increases the hydrolysis of additional formate ester.

In an embodiment, the COFR comprises EGMBE formate which functions as both a mutual solvent precursor and an acid precursor. In such embodiments, the dual functionality of EGMBE formate may preclude the use of additional acid, acid precursor, or RAMs in the COFR. In some embodiments, the COFR comprising EGMBE formate may comprise components to delay the action of the COFR on the filtercake such as for example, pH raising materials. The composition of a COFR comprising a formate (e.g. EGMBE formate) may be adjusted by one of ordinary skill in the art to meet the needs of the process with the benefits of this disclosure.

The components of the COFR (e.g. mutual solvent precursor, acid precursor, aqueous fluid, optional rate adjustment material) may be combined using any mixing device compatible with the composition. In an embodiment, the components of the COFR are combined at the well site; alternatively, the components of the COFR are combined off-site and are transported to and used at the well site. The contacting of the components of the COFR may initiate hydrolysis of the acid precursor and/or mutual solvent precursor by the aqueous fluid, for example via hydrolysis and dissociation of ester groups present in the precursors. Release of one or more acidic species from the acid precursor will decrease the pH of the COFR and accelerate hydrolysis of (i) the mutual solvent precursor to release the mutual solvent, (ii) any additional acid precursors present, or (iii) combinations of (i) and (ii). The mutual solvent may then contact the oil based filtercake and convert the filtercake from oil wet to water wet thus increasing its susceptibility to degradation by the acidic species. The COFR may be designed so as to produce the acidic species and mutual solvent slowly, in-situ within the wellbore following placement therein. Thus, the pH of the COFR at the time of placement (e.g., pumping) down hole may not be as low (i.e., may be less acidic) than would be the case if an aqueous solution of the acidic species was pumped into the well bore. As such, the filtercake removal/cleaning action of the COFR likewise may be delayed, for example delayed from about 2 hours to about 96 hours, alternatively equal to or greater than about 2 to about 3 hours, alternatively equal to or greater than about 24 hours, alternatively from equal to or greater than about 2 to about 5 days. As noted previously, the extent of the delay may be adjusted by one of ordinary skill in the art with the benefit of this disclosure to meet the needs of the process by adjusting the nature of the precursors used (e.g., compound type, amounts, delaying mechanism employed, etc.) or through the addition of RAMs as described earlier.

In an embodiment, a method of servicing a wellbore comprises drilling a wellbore in a subterranean formation and introducing to the formation an oil-based servicing and/or drilling fluid or an aqueous based servicing and/or drilling fluid that comprises at least one oleaginous component, wherein oil coated/wet solids (e.g., filtercake, drill cuttings, etc.) are formed as a result. It is to be understood that "subterranean formation" encompasses both areas below exposed earth and areas below earth covered by water such as ocean or fresh water. Examples of oil-based fluids include oil-based drilling or servicing fluids, invert emulsions, servicing fluids comprising substantially no aqueous component, and the like. Examples of the oleaginous component used in an oil-based fluid may include without limitation olefins, kerosene, diesel oil, fuel oil, synthetic oils, linear or branched paraffins, olefins, esters, acetals, mixtures of crude oil, and combinations and derivatives thereof.

In an embodiment, the introduction of an oil-based fluid (e.g., drilling fluid) may result in the deposition of oil wet solids on the sides or surfaces within the wellbore. The oil-wet solids may be components of the filter cake, a formation face, a fracture face, a perforation, or on a screen (e.g., a gravel pack screen) or another piece of equipment located in the wellbore or subterranean formation.

The method further comprises contact of the oil wet solids with a COFR as described herein to effect removal of the oil from the oil wet solids and/or conversion of the solids from oil wet to water wet. For example, a COFR may be placed in a wellbore and contacted with a filtercake or other oil wet solids located down hole. The oil-wet solids when contacted with a COFR of the type disclosed herein may become water-wet, and then subsequently be degraded by the COFR. For example, upon becoming water wet, acid from the COFR may contact and decompose one or more components of the water wet solids (e.g., calcium-based components such as calcium carbonate contained in the filtercake). The COFRs disclosed herein may result in the removal of oil wet solids (e.g. filter-cake) in a time delayed fashion so as to allow for the efficient removal of oil wet solids while minimizing damage to the formation or to allow for other servicing operations. For example, a time delay in removing the filter cake may provide sufficient time for the COFR to become fully and evenly distributed along a desired section of the wellbore, such that upon activation, the COFR removes the filtercake about simultaneously and equally along the entire treated section of wellbore. Such even treatment prevents isolated breakthrough zones in the filtercake that may undesirably divert subsequent servicing fluids placed downhole. Also, time delays in removing the filter cake may allow for subsequent servicing steps such as removing servicing tools from the wellbore. Following treatment with a COFR, production can then take place, if desired or appropriate, as for example in a hydrocarbon-producing well.

EXAMPLES

The invention having been generally described, the following examples are given as particular embodiments of the invention and to demonstrate the practice and advantages thereof. It is understood that the examples are given by way of illustration and are not intended to limit the specification.

Example 1

Compositions for the removal of an oil based filtercake were prepared having the components indicated in Table 1 and used to treat an oil based filtercake. N FLOW 325 is a delayed formic acid based breaker; BDF 443 is an acid activated surfactant as described in patent application Ser. No. 11/622,898 filed Jan. 12, 2007 and entitled "Surfactant Wash Treatment Fluids and Associated Methods" previously incorporated by reference herein; and MUSOL is a mutual solvent comprising ethyleneglycol monobutyl ether all of which are commercially available from Halliburton Energy Services. Butyl glycol acetate is a mutual solvent precursor, which upon being hydrolyzed 15% produces approximately 10% ethylene glycol monobutylether (EGMBE). The brine contained sodium bromide at a density of 1.2 kg/L. A visual assessment of the clean up of the filtercake was made and the return injectivity of the filtercake was assessed for each composition in Table 1 using a high temperature high pressure (HTHP) cell 100 fitted with a ceramic disk 110 as shown in FIG. 1.

Referring to FIG. 1, the ceramic disc 110 was pre-soaked in fresh water and then placed in the HTHP cell 100. The HTHP cell 100 was then filled with 300 ml water, sealed, and pressurized to 100 psi. The time rate of discharge for 200 ml was measured as a control. After an appropriate duration of time, at relevant temperature and applied differential pressure, a filtercake 120 was formed on the ceramic disc (110) using the drilling fluid under test and the fluid loss was measured. Next, the remaining supernatant liquor (i.e., supernatant drilling fluid) poured from the HTHP cell 100. The HTHP cell 100 was then filled with 350 ml of a composition and allowed to soak at relevant applied differential pressure for an appropriate duration of time. The compositions evaluated are presented in Table 1. Next, the remaining liquid was poured off of the HTHP cell 100, and the filtercake 120 was visually inspected. The HTHP cell 100 was then filled with 300 ml water, sealed, and pressurized to 100 psi. The time rate of discharge for 200 ml was measured again to assess the return injectivity of the filtercake 120. The results of these assessments are also summarized in Table 1 where the percentages (%) give the percent by total weight of each component of the composition.

TABLE 1

| Composition | Visual Assessment of Clean Up | Return Injectivity | Comments |
| --- | --- | --- | --- |
| 10% N FLOW 325, 10% MUSOL, 80% Brine | Good | Good | The results were very good but the negative aspect was that the presence of the MUSOL caused the filtercake to disintegrate very rapidly; much more rapidly than was desirable. |
| 10% N FLOW 325, 1% N FLOW 443, 88% Brine | Good | Good | NONE |
| 10% N FLOW 325, 90% Brine | No obvious removal | ND | NONE |
| 10% N FLOW 325, 15% butyl glycol acetate, 75% brine | Excellent | Excellent | This treatment provided an excellent clean up but also a delayed action on the filtercake. |

The results demonstrate the composition comprising an acid precursor and a mutual solvent precursor, butyl glycol acetate, provided the best visual assessment of clean up of the oil-based filtercake and return injectivity.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2,3,4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore comprising:
   providing a composition comprising a mutual solvent precursor, an acid precursor, and an aqueous fluid, wherein the mutual solvent precursor is chemically modified in the wellbore to produce a mutual solvent; and
   contacting the composition with oil wet solids in the wellbore.

2. The method of claim 1 wherein the mutual solvent precursor releases one or more mutual solvents selected from the group consisting of ethylene glycol monobutylether; diethylene glycol monobutyl ether; triethylene glycol monobutyl ether; tetraethylene glycol monobutyl ether; methanol; isopropyl alcohol; alcohol ethers; aromatic solvents; hydrocarbons; mineral oils; paraffins; butyl glycol acetate, butyl diglycol acetate, butyl triglycol acetate, butyl glycol dimethoxyacetal, isooctanol acetate, isopropanol acetate, 1-methoxy-2-propanol acetate, and derivatives and combinations thereof.

3. The method of claim 1 wherein the mutual solvent precursor comprises an esterified ether.

4. The method of claim 1 wherein the mutual solvent precursor comprises an ester of ethylene glycol monobutylether, an ester of propylene glycol monobutylether, or combinations thereof.

5. The method of claim 1 wherein the mutual solvent precursor is present in the composition in an amount of from about 1% to greater than about 50% based on total volume of the composition.

6. The method of claim 1 wherein the acid precursor comprises lactic acid derivatives; esters and/or formates that are water soluble or partially water soluble; esters or polyesters of glycerol; esters of acetic acid and glycerol; aliphatic polyesters; poly(lactides); poly(glycolides); poly(ε-caprolactones); poly(hydroxybutyrates); poly(anhydrides); aliphatic polycarbonates; polyphosphazenes; poly(ortho esters); orthoesters; esters of oxalic acid; poly(amino acids); esters of propionic acid; esters of butyric acid; halide esters; esters of nitric acid, sulphuric acid, sulphonic acid, sulphinic acid, phosphoric acid, phosphorous acid, phosphonic acid, phosphinic acid, sulphamic acid; derivatives thereof or combinations thereof.

7. The method of claim 1 wherein the acid precursor comprises diethylene glycol diformate.

8. The method of claim 1 wherein the acid precursor is present in the composition in an amount of from about 5% to about 50% based on total volume of the composition.

9. The method of claim 1 wherein the aqueous fluid comprises a brine.

10. The method of claim 9 wherein the brine comprises NaCl, NaBr, $CaCl_2$, $CaBr_2$, $ZrBr_2$, sodium formate, potassium formate, cesium formate, or combinations thereof.

11. The method of claim 9 wherein the brine is present in the composition in an amount of from about 40 wt. % to about 90 wt. % based on total weight of the composition.

12. The method of claim 1 wherein the mutual solvent precursor and the acid precursor are the same or a combination of compounds.

13. The method of claim 12 wherein the same compound comprises a formate ester.

14. The method of claim 13 wherein the formate ester comprises ethylene glycol monobutyl ether formate, diethylene glycol monobutyl ether formate or combinations thereof.

15. The method of claim 1 wherein the composition further comprises a rate adjusting material.

16. The method of claim 15 wherein the rate adjusting material comprises diethyleneglycol monoformate, diethyleneglycol diformate, monoethyleneglycol diformate, monoethyleneglycol monoformate, derivatives thereof or combinations thereof.

17. The method of claim 15 wherein the rate adjusting material is present in an amount of from about 0.1% to about saturation.

18. The method of claim 15 wherein the rate adjusting material comprises mineral acids, organic acids, acidic anhydrides, p-toluenesulfonic acid, NaOH, $Na_2CO_3$, $NaHCO_3$, $Mg(OH)_2$, an organic base, an aliphatic or aromatic amine type compound, or combinations thereof.

19. The method of claim 1 wherein the oil wet solids comprise a filtercake.

20. A method of servicing a wellbore comprising:
introducing an oil-based fluid into a wellbore, wherein the oil-based fluid forms oil wet solids in the wellbore;
contacting the oil wet solids in the wellbore with a composition comprising a mutual solvent precursor; an acid precursor and an aqueous fluid, wherein the mutual solvent precursor is chemically modified in the wellbore to produce a mutual solvent; and
allowing the oil wet solids to become water wet.

21. The method of claim 20 wherein the oil wet solids are delayed in becoming water wet following contact with the composition.

22. The method of claim 21 wherein the delay is from about 2 to about 96 hours.

23. The method of claim 20 wherein the oil-based fluid is a drilling fluid and the oil wet solids comprise a filtercake.

24. The method of claim 20 wherein the mutual solvent precursor comprises an ester of ethylene glycol monobutyl ether and the acid precursor comprises diethylene glycol diformate.

25. The method of claim 20 wherein a formate ester comprises both the mutual solvent precursor and the acid precursor.

26. A method of servicing a wellbore comprising:
providing a composition comprising a mutual solvent precursor, an acid, and an aqueous fluid; and
contacting the composition with oil wet solids in the wellbore.

* * * * *